US009623808B2

(12) United States Patent
Bonenberger

(10) Patent No.: US 9,623,808 B2
(45) Date of Patent: Apr. 18, 2017

(54) REMOVABLE STORAGE MODULE FOR GOLF CART

(71) Applicant: Frank Philip Bonenberger, Rockledge, FL (US)

(72) Inventor: Frank Philip Bonenberger, Rockledge, FL (US)

( * ) Notice: Subject to any disclaimer, the term of this patent is extended or adjusted under 35 U.S.C. 154(b) by 0 days.

(21) Appl. No.: 14/167,922

(22) Filed: Jan. 29, 2014

(65) Prior Publication Data

US 2014/0217139 A1 Aug. 7, 2014

Related U.S. Application Data

(60) Provisional application No. 61/760,016, filed on Feb. 1, 2013.

(51) Int. Cl.
*B60R 9/06* (2006.01)
*B62D 21/14* (2006.01)
*B62D 21/18* (2006.01)
*B60K 16/00* (2006.01)

(52) U.S. Cl.
CPC .............. *B60R 9/065* (2013.01); *B62D 21/14* (2013.01); *B62D 21/183* (2013.01); *B60K 16/00* (2013.01); *B60K 2016/003* (2013.01); *B60K 2016/006* (2013.01)

(58) Field of Classification Search
CPC B62D 21/183; B62D 21/14; B60K 2016/003; B60K 2016/006; B60K 16/00; B60R 9/065; B60R 9/06

USPC ........ 224/274, 403, 404, 401, 488, 497–499
See application file for complete search history.

(56) References Cited

U.S. PATENT DOCUMENTS

| 5,056,695 | A | * | 10/1991 | Giblet | 224/484 |
| 5,095,718 | A | * | 3/1992 | Ormond et al. | 62/457.5 |
| 5,947,356 | A | * | 9/1999 | Delong | 224/404 |
| 6,209,941 | B1 | * | 4/2001 | Cross | B62J 9/00 224/426 |
| 6,401,995 | B1 | * | 6/2002 | Yuille | B60R 9/00 220/483 |
| D463,999 | S | * | 10/2002 | Beck et al. | D12/16 |
| 6,457,317 | B1 | * | 10/2002 | O'Donnell | 62/60 |
| 6,641,192 | B2 | * | 11/2003 | Eschenfelder | 296/37.1 |
| 6,845,895 | B2 | * | 1/2005 | Jones et al. | 224/585 |
| 6,932,406 | B2 | * | 8/2005 | Waye | B60R 9/00 224/402 |

(Continued)

*Primary Examiner* — Adam Waggenspack
*Assistant Examiner* — Matthew Theis
(74) *Attorney, Agent, or Firm* — Gregory Stauf

(57) ABSTRACT

A storage unit capable of being mounted on a shelf on the rear of a vehicle is designed to protrude from the rear of the vehicle to provide more storage space. The storage unit is further designed to be removable, and may be subdivided with movable partitions. The storage unit may be further designed to provide a controlled temperature environment inside. It may be further designed specifically for use on the rear of a golf cart type vehicle, which may include adjustable feet to help hold the storage unit on the rear of the golf cart type vehicle. The storage unit may also be designed to allow for foldability, such that it can be more compactly folded and shipped, stored or transported. There may also be a storage box provided to store the folded storage unit above a vehicle such as a golf cart.

43 Claims, 9 Drawing Sheets

(56) References Cited

U.S. PATENT DOCUMENTS

| | | | |
|---|---|---|---|
| 7,052,066 B2* | 5/2006 | Emery | B60R 11/06 |
| | | | 296/37.1 |
| 7,093,872 B2* | 8/2006 | Stanfield et al. | 296/37.1 |
| 7,418,311 B1* | 8/2008 | Lagassey | G07F 9/026 |
| | | | 221/150 R |
| 7,942,295 B1* | 5/2011 | Hume | B60R 11/06 |
| | | | 206/372 |
| 2003/0015562 A1* | 1/2003 | Jones | B60R 9/065 |
| | | | 224/585 |
| 2005/0194414 A1* | 9/2005 | Lynch | B60R 9/055 |
| | | | 224/401 |
| 2008/0217194 A1* | 9/2008 | Lewter | A63B 55/60 |
| | | | 206/315.6 |
| 2010/0065593 A1* | 3/2010 | Campbell et al. | 224/42.32 |

* cited by examiner

REMOVABLE STORAGE MODULE FOR GOLF CART

CROSS REFERENCE TO RELATED APPLICATIONS

This application is a U.S. Utility application taking priority from U.S. Provisional application No. 61/760,016 filed Feb. 1, 2013, and herein incorporated by reference.

BACKGROUND OF THE INVENTION

While originally intended for use purely to transport golfers and their clubs around a golf course, golf carts have come into more widespread use as transports in a variety of situations. Some communities have been designed to avoid use of cars, and to permit transport on foot and via pathways accommodating golf carts. In other cases, individuals may wish to use a golf cart as a supplement or as a complete replacement for an automobile, for reasons including, but not limited to, loss of a driver's license, temporary or permanent incapacity, or desire to use purely electric transportation for ecological or self sufficiency reasons. When a golf cart is used in these ways, a need exists for more storage capacity, storage security and flexibility than a golf cart normally provides.

Storage on a normal golf cart includes only a small wire basket or two, intended for holding small items like a hat or sunglasses, one or two glove boxes which are not normally lockable, and a shelf or well in the back for holding two sets of golf clubs. Since a golf cart is normally used only for golfing in good weather, storage areas are not protected from inclement weather such as rain or temperature extremes. Since it is also normally attended by the golfers for the full time it is on the course, the storage provides little or no security for items being transported. Finally, there is little flexibility in storage, as its primary storage area is configured to hold nothing more or less than two bags of golf clubs.

REFERENCES

U.S. Pat. No. 5,344,020, Steve Ferguson, Storage Device for Golf Carts

U.S. Pat. No. 5,788,070, Robert K. Banker, Golf Equipment Storage Device

U.S. Pat. No. 6,641,192 B2, Charles R. Eschenfelder, Storage Cabinet for Use in a Golf Cart

SUMMARY DISCLOSURE OF INVENTION

The invention described herein relates generally to a golf cart mounted storage unit, and solves these and other problems as described below. Features of this invention should include the ability to protect items being transported from rain, theft and temperature extremes. It should allow some reconfiguration to accommodate different sizes, shapes and types of items. In addition, it would be desirable to have this storage unit be removable from the golf cart, so that the cart could be used for its original purpose of transporting golf clubs, and ideally the unit should be collapsible so that it would require less storage space when not in use on the cart. This would also allow for easier and cheaper shipping of the unit. This invention provides these advantages.

In one embodiment, the invention described herein relates generally to a storage unit which can be attached in place of the golf bags, sitting in the "well" or depression in the ledge on the back of the golf cart which normally holds the bottoms of the golf bags in place. It would occupy the majority of the space above said well, and is thus intended for use on a golf cart when the golf cart is being used for more general purposes than golfing, as it would occupy the space normally reserved for golf clubs. In a preferred embodiment, this storage unit will be removably attached to the back of the golf cart. In another preferred embodiment, this storage unit will extend beyond the rear of the golf cart to provide a larger storage volume than would be possible if it merely occupied the space above said well.

Another embodiment of this invention has this storage unit built out of lightweight materials, so that it can be easily removed from the golf cart if it is desirable to use said cart for golfing. This is also desirable for shipping or otherwise transporting said storage unit, whether before or after it is assembled. In a preferred embodiment, this storage unit will be removably attached to the back of the golf cart.

Another embodiment of this invention has the storage unit built in such a way that it can be folded for removal, shipping or storage. This may include any combination of rigid sections and flexible sections either or both of which can be manipulated in ways including, but not limited to, folding, telescoping and bending. In a preferred embodiment, this storage unit will be removably attached to the back of the golf cart.

Another embodiment of this invention has provisions for internal storage of items. These provisions may include, but are not limited to, shelves, hooks, straps, internal dividers, and brackets, which may be removable and/or movable to different locations. External attachments for items may also be present, such as, but not limited to, hooks, straps, elastic bands, and brackets. In a preferred embodiment, this storage unit will be removably attached to the back of the golf cart.

Another embodiment of this invention may include climate control of part or all of the interior. This may be helpful for keeping hot items, such as hot food being picked up or delivered, hot, or may be helpful for keeping cold items, such as perishable groceries, cold. Different sections of the storage unit may be kept hot, cold, or may not be conditioned. Power for this climate conditioning can be drawn from the battery system of the golf cart. Other possible sources include, but are not limited to, an electrical line run to a nearby outlet, solar power, or wind power. In a preferred embodiment, this storage unit will be removably attached to the back of the golf cart.

BRIEF DESCRIPTION OF DRAWINGS

FIG. 4D shows a top view of an alternate embodiment of adjustable bottom legs and feet, while

MODE(S) FOR CARRYING OUT THE INVENTION

Detailed Description

Figure 1:
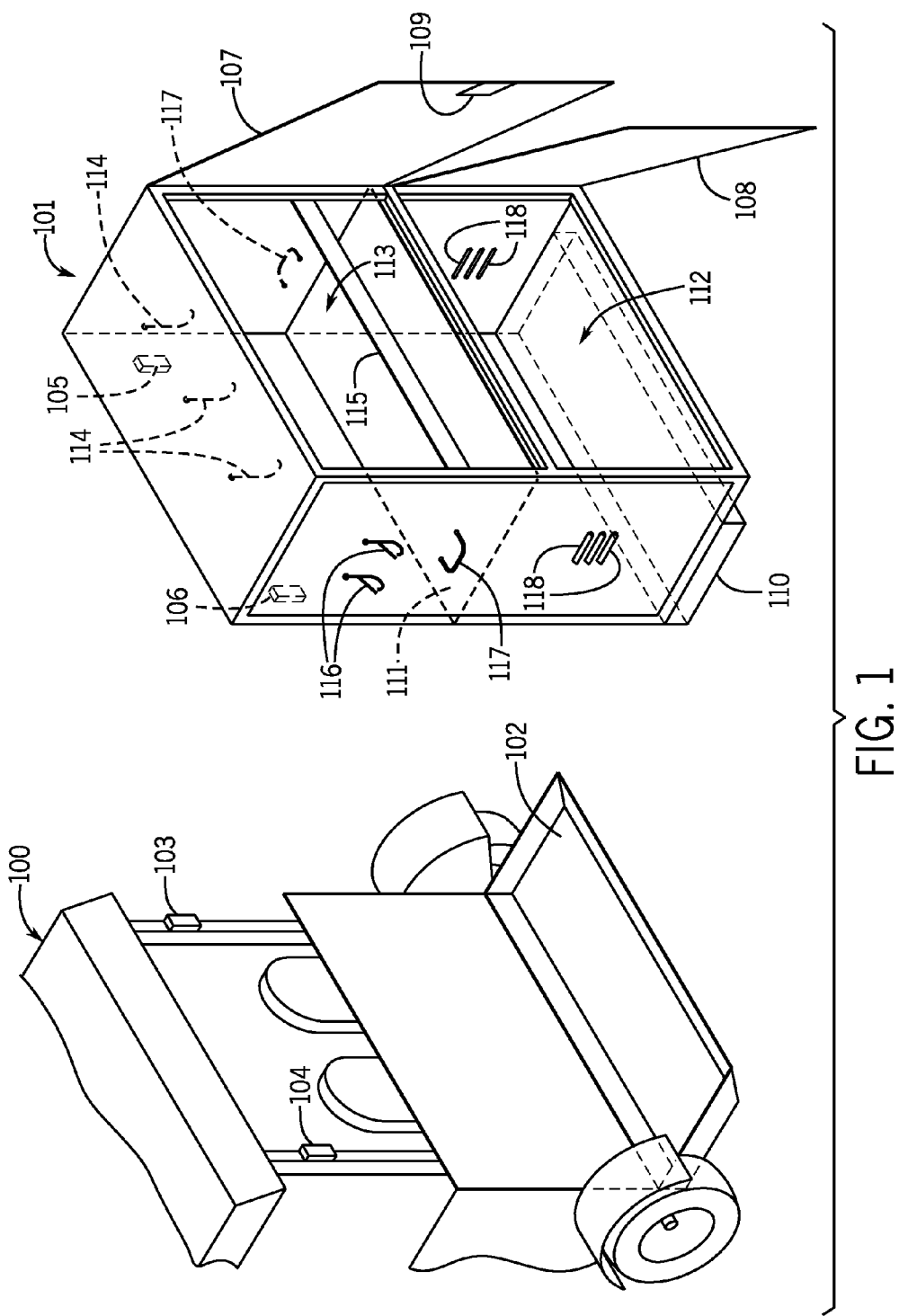
FIG. 1 shows an embodiment of a of a storage unit and rear end of a golf cart, with enumerated parts.

The present invention and its various embodiments are described below, with reference to figures as necessary. Reference numbers are used to match particular elements described in the text with those shown in figures. Although the embodiments disclosed will be described with reference to the embodiments shown in the drawings, it should be understood that the embodiments disclosed can be embodied in many alternate forms of embodiments. In addition, any suitable size, shape or type of elements or materials could be used.

Generally speaking, the present invention as shown in FIG. 1 provides additional storage space for a vehicle 100 such as, but not limited to, a golf cart. It describes a storage unit 101 or container suitable for mounting on the back of said vehicle. In a preferred embodiment, this storage unit 101 would occupy the entire back side of the vehicle 100, and would allow the driver to see over the top of it to the rear, or through the top if part or all of the storage unit 101 were made of transparent materials. The storage unit is essentially cuboid in shape, having six approximately rectangular faces or panels. Note that for streamlining or appearance purposes, the faces or panels may be curved, such that two or more faces are only very approximately rectangular, and more closely approximate triangles or arcuate sections. The definition of "cuboid" used herein is intended to include such deviations of faces or panels from rectangularity. The storage unit is designed to be easily removable from the vehicle. In one embodiment, said vehicle 100 has a protruding rear shelf 102 which would provide support for the storage unit 101. The storage unit 101 could be held on by attachment points 103 and 104 on the vehicle 100, which would connect to matching attachment points 105 and 106 on the storage unit 101. These attachments could be made by a variety of methods, including, but not limited to, "C clamps", which could include slideable arms such as found in a bench vise or "butterfly" nuts, pin and socket joints, quick release joints, spring clamps, straps, and other systems as known to those skilled in the art. Attachment mechanisms only on the vehicle 100 or on the storage unit 101 may be used, with the expectation that there would be surfaces or structural members present on the other object suitable for attachment or clamping. Other types of fastening systems would suggest themselves to one skilled in the art, and are intended to be covered in this disclosure.

It is expected that the storage unit 101 would have one or more doors to allow access to the interior. One example of such doors is shown as items 107 and 108. Although these doors are shown as single hinged and swinging out towards the rear of the vehicle, in other embodiments there could be a single door, split doors with hinges on each side closing in the center of the opening, sliding doors, one or more doors in the side of the storage unit, and/or one or more doors in the top of the unit which may open upwards. Any door which swings out would require a releasable latching mechanism 109 to fasten it shut. In one embodiment of the invention, this latch would comprise a lock, which could be built-in or a padlock and which could include, but is not limited to, a keyed lock, a combination lock, or an electronic lock.

In one embodiment of this invention a protrusion 110 on the bottom of the storage unit 101 would match the recessed rear shelf 102 or "well" found on a typical golf cart. This is advantageous in that it provides secure footing for the storage unit, while allowing it to extend past the rear of the golf cart. An extension past the rear of the vehicle 100 is useful because it provides much more storage volume and depth than what would typically be found on the rear shelf of a golf cart, allowing for a much wider variety of shapes and sizes of items to be stored in said storage unit. In particular it would be possible to store larger items than bags of golf clubs. Note that while only one large protrusion is shown in the diagram, it is obvious that multiple smaller protrusions in a variety of sizes and positions could be used to provide secure footing for the storage unit. This allows the storage unit to fit on a variety of rear shelves having different wells, including no well, found on different models of golf carts or other vehicles.

In one embodiment of this invention the storage unit 101 can be divided by at least one partition 111 into multiple sections 112 and 113. The partition 111 may be movable and/or removable, and may include multiple horizontal or vertical partitions to subdivide the storage unit 101 into multiple compartments in many different configurations. Systems such as, but not limited to, brackets, pegs, or slots, any of which may be moveable to different positions, may be used to secure these partitions. One or more compartments 112 may be insulated for storage of cold or hot items. One or more partitions 111 in the case wherein said partition 111 is horizontal may have one or more recesses in order to catch liquid, making it a drip pan, in particular for the case wherein the insulated compartment may be used for cold items which may have condensation in a humid environment. It may then be particularly desirable to make this drip pan partition removable. Alternatively, it may also be desirable to add a drain plug (not shown) to such a drip pan so that it may be emptied at intervals. It may also be desirable to add a drain line (not shown) to this drain plug so that the drip pan can be emptied without removal, or even continuously while the storage unit 101 is in use. Such a drain line would run downwards to empty outside the storage unit 101. It may also be desirable to make upper compartment 113 transparent if the overall storage unit 101 is high enough to block the view of the driver of the vehicle 100.

In another embodiment of this insulated compartment 112 a removable insulated liner may be used which can be dropped in from above or slid in from the front. This insulated liner may have one or more drains (not shown) for draining out any liquid which accumulates inside this liner. It may be rigid or partially or completely flexible, whereby if completely flexible it could be attached to attachment points inside the storage compartment 112. While the insulated compartment is shown to be the bottom compartment 112 in FIG. 1, specifically in the case of a compartment for storing cold items, since cold air sinks and this would help keep cold items cold longer. clearly it could be any compartment in the storage unit 101. In particular, if top compartment 113 is used for the insulated compartment, it could make it easier to place a removable insulated liner into said top compartment 113 from above.

In one embodiment of this invention one or more compartments 112 which is insulated for storage of cold or hot items may have a system attached (not shown) to refrigerate or heat it. Such a system may be based on electrical or chemical fuel. If electrical, it could take its power from the battery system of the vehicle 100, which is particularly suited to the case wherein the vehicle is a golf cart, since a golf cart has an ample battery supply. Some golf carts run on gasoline, diesel or propane storage tanks, in which case the storage unit refrigeration/heating system could use fuel from the vehicle. Alternatively, if the vehicle has an alternator or similar device which generates electricity as is typical for subsystems such as headlights, the refrigeration/heating system could use the electricity from that electricity generation system. The refrigeration/heating system could also take its power from an electrical cord run to a nearby receptacle. In other embodiments solar or wind systems (not shown) can generate electrical power. These solar or wind systems may be permanently attached to the vehicle, such as, but not limited to, a solar panel on the roof of the vehicle, or detachable for placement near the vehicle 100. If a heating or cooling system runs on chemical fuel, such fuels may include, but are not limited to, gasoline, diesel, Hydrogen, Sterno or propane.

In one embodiment of this invention, interior fittings inside the storage unit 101 may be used to secure or fasten contents against shifting during movement of the vehicle 100. These fittings may include, but are not limited to, hooks 114 and straps 115. Hooks are particularly advantageous for hanging grocery bags in the storage unit. These hooks 114 may include, but are not limited to, open hooks or "snapring" hooks. The straps 115 may include, but are not limited to, fixed straps, elastic straps such as "bungee" type cords, and straps with tightening systems such as ratchets. It would also be possible to have exterior fittings 116 to which items could be attached if they are more weatherproof, they are bulkier or it is desired to have them more accessible. It would also be possible to add handles 117 in order to lift the storage unit 101 on and off the vehicle 100. Although these handles 117 are shown protruding from the sides of the storage unit 101, they could be on any side , including one with a door on it if the door is latched. Rather than protruding as shown, these handles 117 could take alternate forms such as those skilled in the art would be familiar with such as, but not limited to, recessed, pop-out, swing out or detachable handles. It would also be possible to add vents 118 in any compartment for purposes including, but not limited to, equalizing pressure, equalizing temperature, or preventing moisture buildup inside the storage unit 101. In preferred embodiments, these vents would be shaped such as to prevent precipitation from entering the storage unit 101, and would have screens over them to prevent entry of insects or debris.

In one embodiment of this invention for additional security, the attachment system 103, 104, 105 and 106 may comprise bolts whose heads are "carriage" style, not allowing for use of a wrench, coming from the golf cart frame in the region of 103 and 104, said bolts passing through the rear wall of the storage unit 101 and having wrench or finger tightenable nuts inside the enclosed space of the storage unit 101, for example in the upper compartment 113. In this way, without access to the fastened or locked storage unit, it would be impossible to unbolt the removable storage unit and remove it from the vehicle. In alternate embodiments this end could be achieved by welding bolts onto the golf cart frame and having nuts inside the storage unit or by using "security" style fasteners with unusual heads and/or nuts inside or outside the storage unit or both to prevent easy removal of the storage unit by an unauthorized person.

In one embodiment of this invention, if the vehicle 100 did not have a lower rear shelf 102, additional attachment points similar to 103 and 104 on the vehicle 100 and attachment points 105 and 106 on the storage unit 101 could be used in other locations on the rear of the vehicle 100 to attach the storage unit 101. These additional attachment points are not shown in any diagram.

Figure 2:
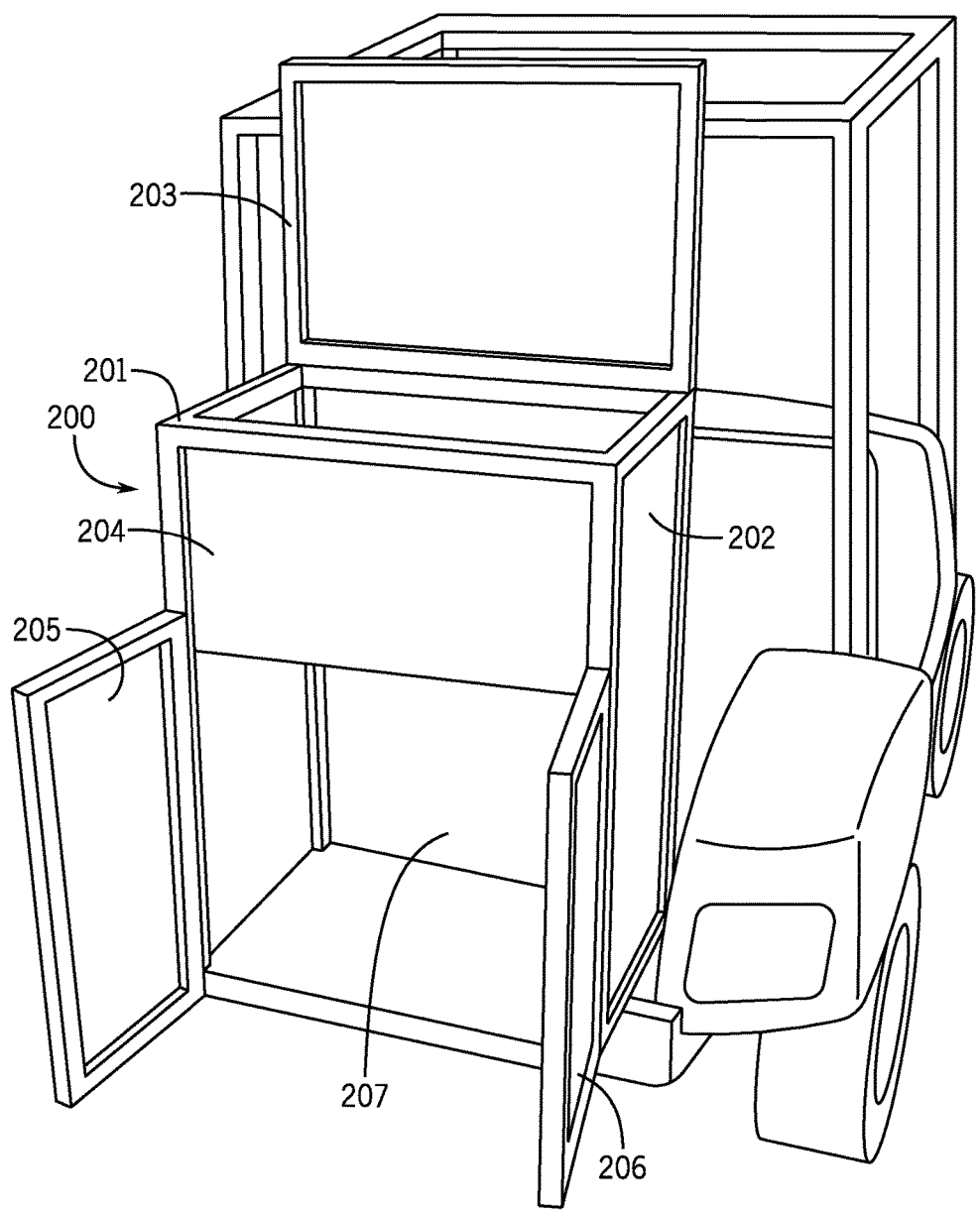
FIG. 2 shows an embodiment of a storage unit mounted on a golf cart, with one possible door configuration.

In one embodiment of this invention shown in FIG. 2, the structural members of the storage unit 200 may be rigid members such as, but not limited to, round or square cross section tubing 201 which form a framework. In a preferred embodiment these rigid members may be made of lightweight material such as, but not limited to, aluminum and carbon composite rods. The panels 202 may be lightweight rigid sections which can be inserted or removed from this framework such as, but not limited to, polycarbonate, polystyrene, PVC (poly vinyl chloride), HDPE (high density polyethylene), and PE (polyethylene). In this way, part of the storage unit may be open to the air, while part may be closed off by these panels. In this particular embodiment the door 203 for the upper section 204 swings up to provide access to the upper section 204, while there are two front doors 205 and 206 which open to the front of the unit, providing access to the lower section 207. The storage unit is designed to be of lightweight construction and thus easily removable. The panels could instead be flexible sections made of materials such as, but not limited to, cloth such as canvas, ballistic nylon or flexible plastic, which can be inserted or removed from this or a similar framework. In one particular embodiment, the panels could be made out of flexible material such as, but not limited to, canvas surrounding the framework. In any case wherein flexible material such as fabric is a primary panel construction system, zippers could be used to open any doors and partitions could similarly be partially or completely removed by means of zippers.

Figure 3:
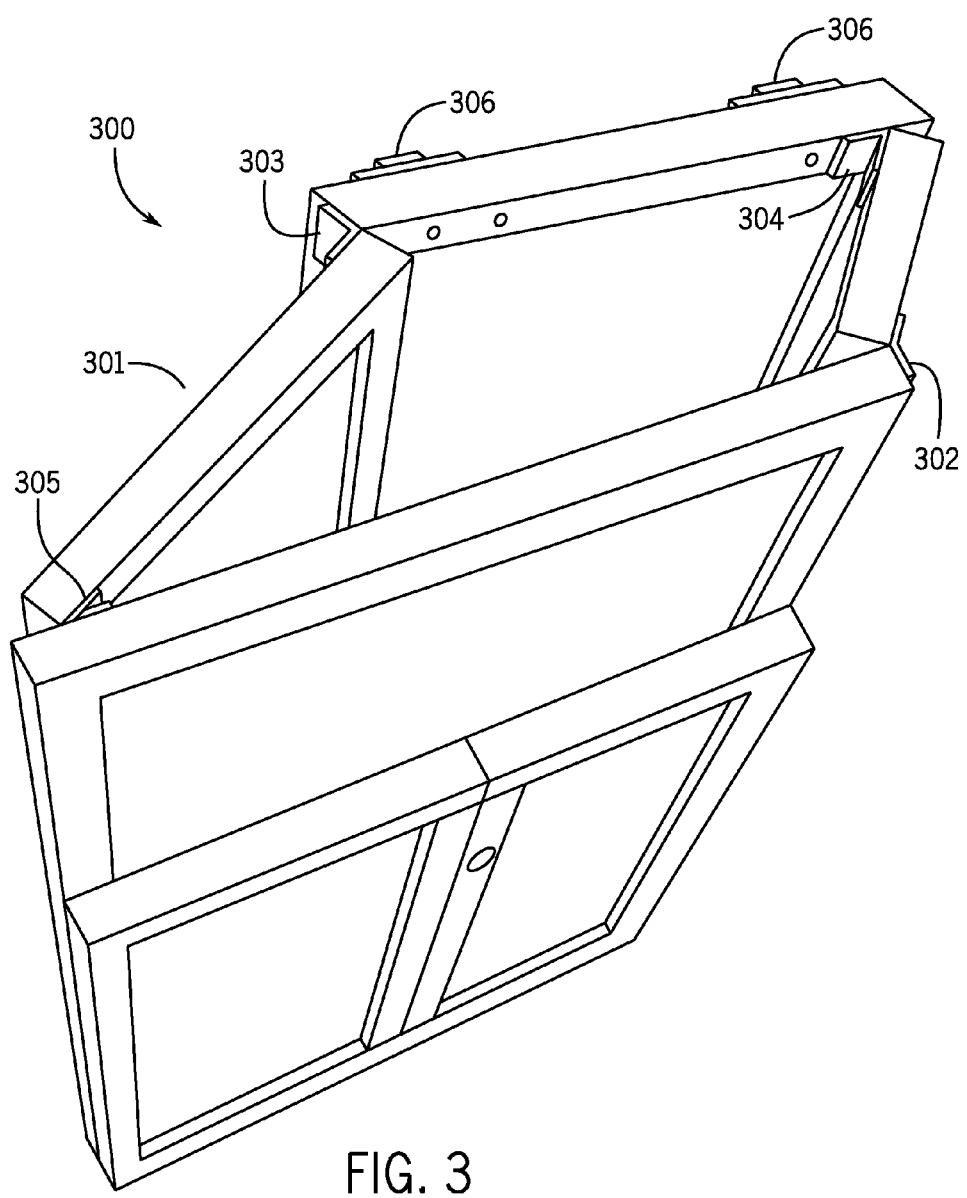
FIG. 3 shows an embodiment of a frame for a storage unit partially folded.

In one embodiment of this invention shown in FIG. 3, the structural members of the storage unit 300 may be rigid members such as, but not limited to, round or square cross section tubing 301 which form a framework. The framework of rigid members is designed to fold up so that the storage unit can be stored or transported more compactly. In this embodiment at opposing corners 302 and 303, there are interior flat-folding plastic hinges, while at opposing corners 304 and 305 there are exterior flat-folding plastic hinges to allow the unit to fold nearly or completely flat. FIG. 3 shows such a framework partially folded up, after top, bottom, and interior partitions have been removed. In this embodiment a top door such as 203 from FIG. 2 was hinged at hinges 306, and has been removed using lever type removable hinges, as are known to those skilled in the art. A variety of systems known to those skilled in the art other than that shown may be used for the folding of the rigid members including, but not limited to, telescoping sections, hinges, ball-and-socket joints, or swivel joints. Items inside the storage unit such, but not limited to, partitions 111 and hooks 114 from FIG. 1 may also fold up along with the storage unit 300. The panels may be lightweight rigid or flexible sections which can be inserted or removed from this framework. Panels which may be removed include bottom, side, back, front and top exterior panels, and in a particular embodiment in the case of a top or front panel may include a door. In this way, part of the storage unit may be open to the air, while part may be closed off by these panels. The storage unit is designed to be of lightweight construction and thus easily removable from the vehicle.

In one embodiment of this invention instead of the fixed section 110 protruding from the bottom of the storage unit 101 removable and adjustable feet may be used to secure the storage unit 101 in the well 102 of a golf cart 100. Examples of this embodiment are shown in FIG. 4. Here, in FIG. 4a only the lower portion of a storage unit 400 is shown, with two pivot points or legs 401 and 402, each with a "foot" 403 and 404 at the bottom which would sit in the well of a rear of a golf cart. These legs 401 and 402 can have adjustable levels of protrusion from the bottom of the storage unit 400, this adjustment obtainable by a variety of means known to those skilled in the art such as, but not limited to, screw type threads, or a slider mechanism in the storage unit, such adjustment allowing for accommodation of varying vertical heights of wells 405. In another embodiment, it may be desirable to have the length of the legs fixed, and adjust the feet up and down on the legs, though this provides less flexibility in the case of different well recesses. Each foot 403 and 404 can be swiveled on its respective pivot point 401 and 402 as shown by the arrows in FIG. 4b to cross the front to back depth of the well 405 of a golf cart rear platform, with a larger swivel angle, closer to 90 degrees, used for a deeper well, having more front to back distance, and a smaller swivel angle, closer to 0 degrees, used for a shallower well, allowing for a wide range of well depths to be accommodated by adjusting this angle. Once swiveled to a particular position, the feet could be locked into place by a variety of methods known to those skilled in the art including, but not limited to, a pin, a set of tightening or locking nuts on legs 401 and 402, and notches in the swivel portion of the legs 401 and 402.

Figure 4A:
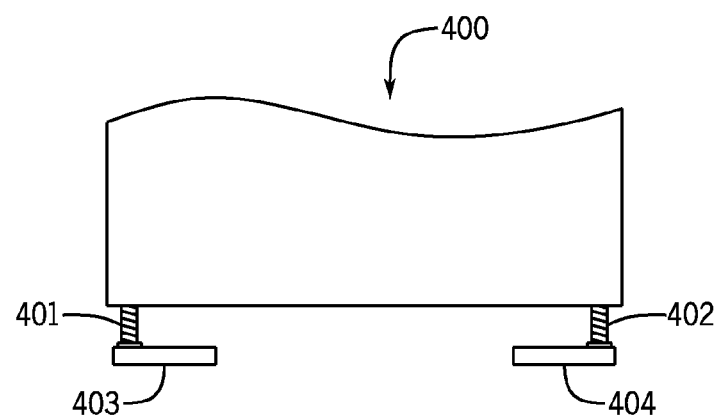
FIG. 4A shows a side view of an embodiment of adjustable bottom legs and feet for bracing the storage unit in the well of a golf cart.
Figure 4B:
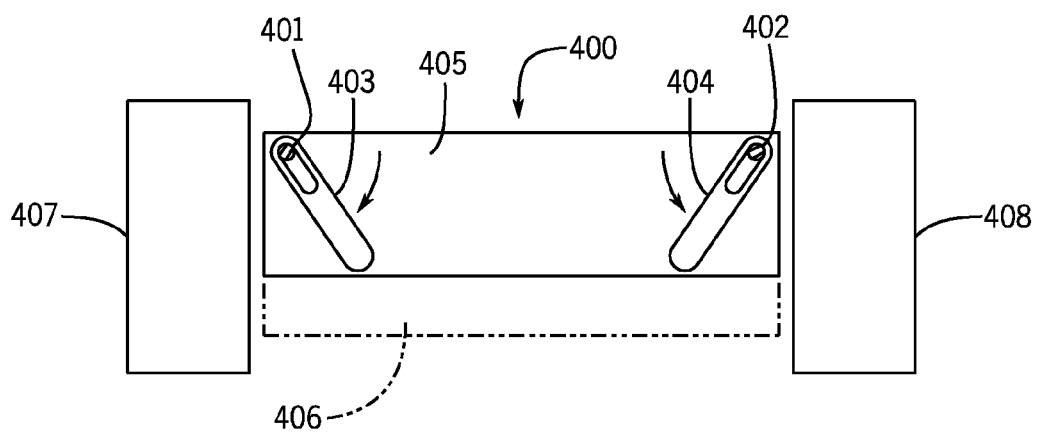
FIG. 4B shows a top view of this embodiment.
Figure 4C:
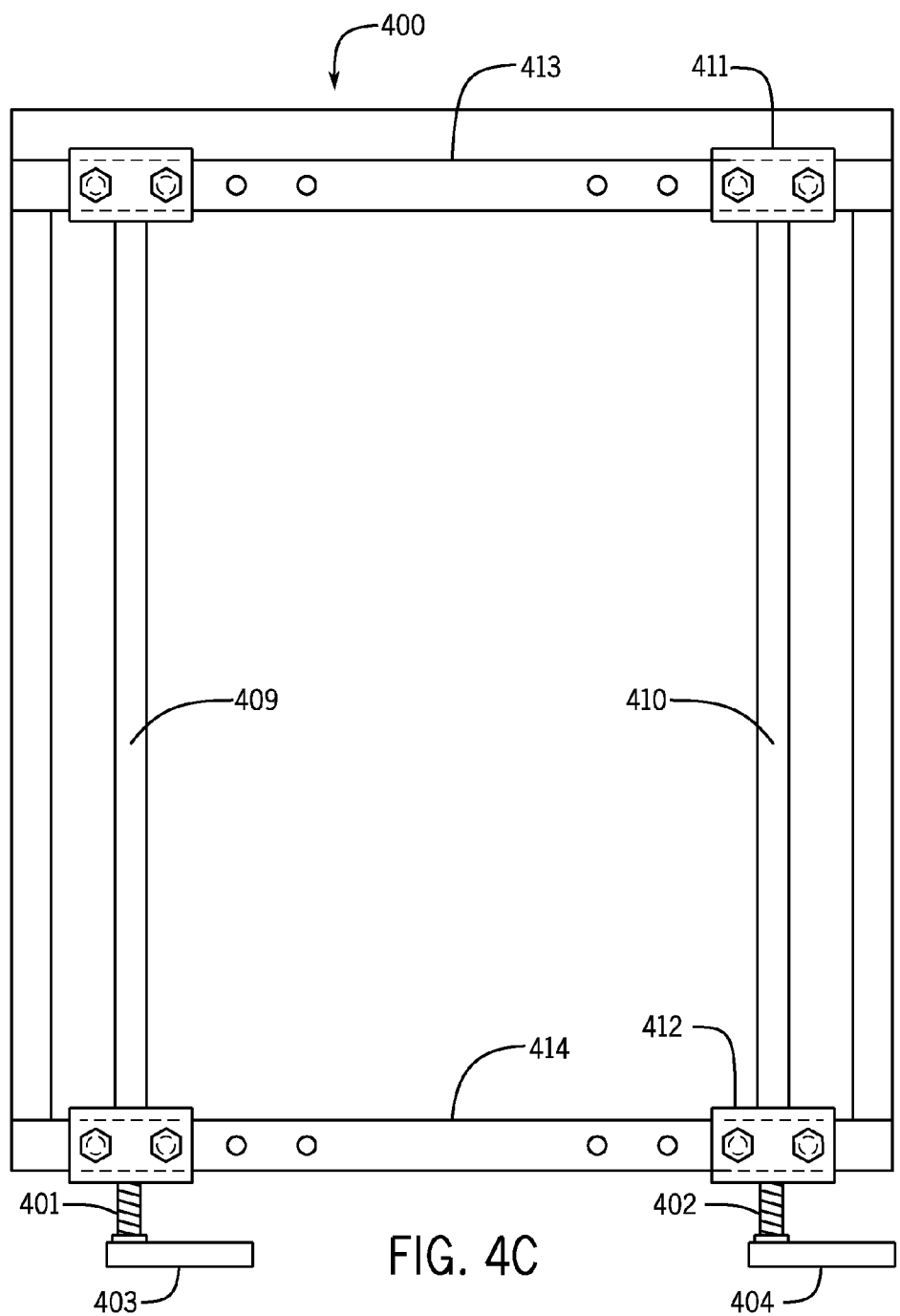
FIG. 4C shows a rear view of the storage unit with adjustable bottom legs and feet.

In order to provide more flexibility if the distance from the framework or attachment points 103 and 104 to the well 102 varies, in a particular embodiment it is desirable to make a slot in feet 403 and 404 where legs 401 and 402 pass through them, so that the feet can be slid back and forth on the legs. In this way the portion of a foot 403 or 404 which protrudes on the leg 401 or 402 towards the front of the vehicle relative to the portion of a foot 403 or 404 which protrudes on the leg 401 or 402 towards the rear of the vehicle may be adjusted. Once the relative front/back protrusion of a foot 403 or 404 is adjusted by means of the slot, a locking nut or other similar device can be used to fix it in position. It may be desirable to provide a recess on the lower side of foot 403 and 404 such that the locking nut does not protrude below the foot towards the surface of the well, so that the bottom surfaces of feet 403 and 404 are in contact with the surface of the well rather than a nut or other fastening device being in contact with the surface of the well. Note the extension 406 of the storage unit 400 past the rear of the vehicle 100 beyond the front to back depth of the well 405 as discussed earlier, allowing storage of larger objects than could be accommodated in a storage unit which was not deeper than the front to back depth of the well 405. In FIG. 4b golf cart wheel fenders 407 and 408 to either side of the storage unit 400 are shown. This allows the storage unit to fit on a variety of rear shelves having different wells, including no well, found on different models of golf carts or other vehicles.

The legs 401 and 402 and/or feet 403 and 404 could be removable to allow for a golf cart or other vehicle without a well, having only a flat platform, to be used with this storage unit, or to allow the storage unit to be placed on its base without danger of tipping over. Alternatively, the legs 401 and 402 and/or the feet 403 and 404 could be capable of being made approximately flush with the bottom of the storage unit, by methods including, but not limited to, moving them up into or against the body of the storage unit 400 or folding them out of the way. Wheels may also be used on the bottom of the storage unit, which wheels may be removably attached or folded up out of the way when the storage unit is being used on the back of a vehicle.

Another way the feet can be adjusted for different rear shelves on vehicles is by means of sliding the leg pivot points 401 and 402 on the rear of the storage unit 400. In one embodiment shown in FIG. 4c this can be accomplished by using separate frame pieces 409 and 410, with attachment points at the top and bottom of the overall storage unit 400, for example points 411 and 412 for movable frame pieces 409 and 410. By using structures known to those skilled in the art such as, but not limited to, multiple holes, slots, or sliding clamps on or in the upper 413 and lower 414 frame bars of storage unit 400, the movable frame sections 409 and 410 holding the leg pivot points 401 and 402 can be moved to accommodate different rear well 405 widths. In this exemplary embodiment multiple holes on upper 413 and lower 414 frame bars are shown. These movable rear frame sections 409 and 410 have the additional advantage of allowing for accommodation of different spacings between attachment point 103 and 104 on the rear of the vehicle 100 (FIG. 1).

Figure 4D:
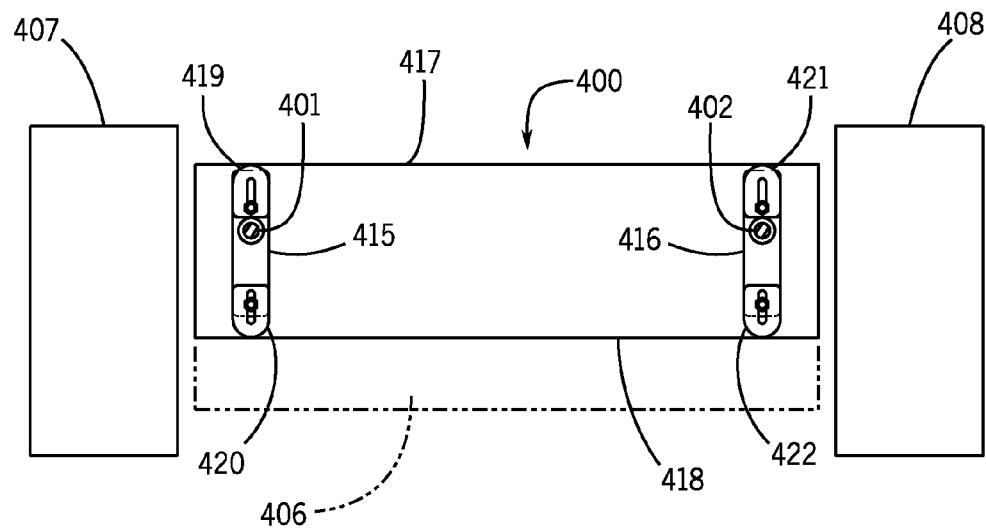
Figure 4E:
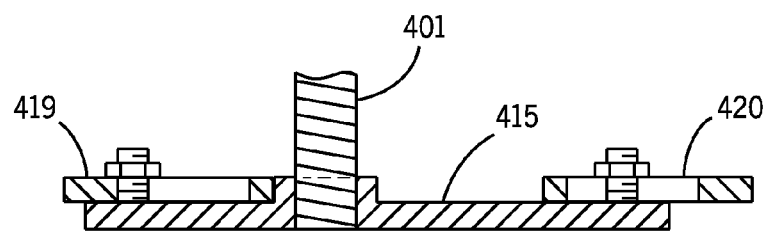
FIG. 4E shows a side view of one leg and foot of this embodiment.

Another embodiment of this invention which allows for adjustment of the lower protrusion of the storage unit is shown in FIGS. 4d and 4e. Foot 415 is shown attached to leg 401, and foot 416 is shown attached to leg 402. As in the other adjustable lower protrusion embodiment, provision must be made for different distances between legs 401 and 402 and the front edge 417 of well 400, and between legs 401 and 402 and the rear edge 418 of well 400. In this embodiment, a sliding plate 419 allows for adjustment of the overall foot (415 plus 419) to fit snugly against the front edge 417 of the well. Similarly a sliding plate 420 allows for adjustment of the overall foot (415 plus 420) to fit snugly against the rear edge 418 of well 400. Bolts on plates 419 and 420 and slots on foot 415 allow for this adjustment. Note that other specific methods of achieving this sliding adjustment are also intended to be incorporated in this invention, such as, but not limited to, having slots on plates 419 and 420 and bolts on foot 415, using open ended or "U" shaped slots as well as the closed ended slots shown, and using "T" bolts or similar fastening devices to allow attachment of the plates 419 and 420 to foot 415. These fastening devices may be countersunk into whichever plate will be against the floor of the well so that the plate, rather than the fastening device, makes reliable contact with the floor of the well. In particular a "T" bolt may be countersunk to hold the head in place in a plate when a locking nut is tightened. Similar sliding plates 421 and 422 allow for adjustment of foot 416 to front 417 and rear 418 edges respectively of well 400. Feet 415 and 416 can still be rotated on legs 401 and 402 as necessary. FIG. 4e shows foot 415 attached to leg 401 from a side view. In an alternative embodiment to that pictured, the sliding plates 419 and 420 may lie above, rather than below, the foot 415, with corresponding rearrangement of countersinks, bolts and slots. These embodiments with sliding plates allow for more convenient attachment of the storage unit into a vehicle well, which may have ribs or other floor patterning which could make rotating feet such as 403 and 404 in FIGS. 4a and 4b difficult to use.

Figure 5:
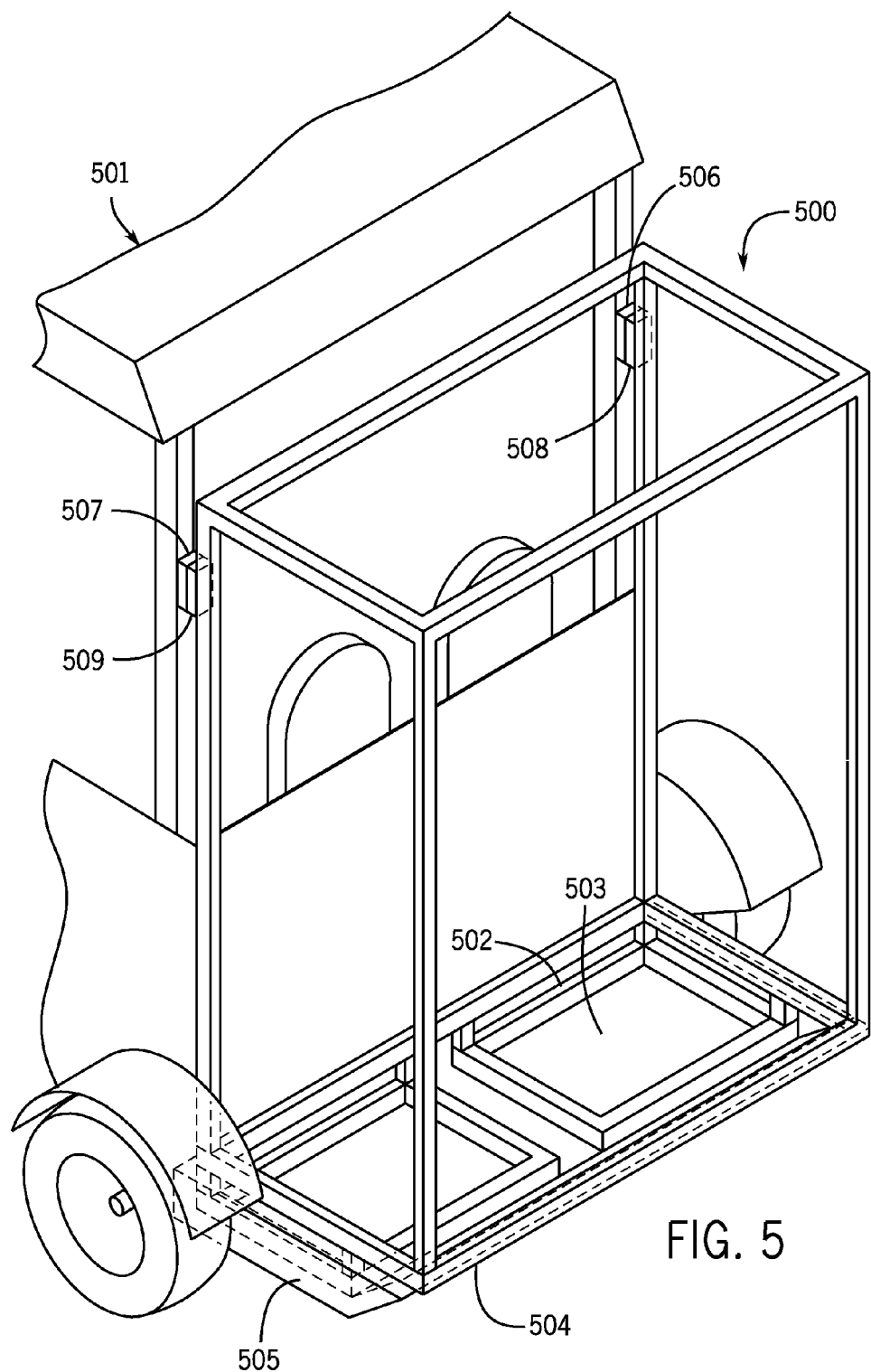
FIG. 5 shows an embodiment of a framework for a storage unit mounted on the back of a golf cart.

FIG. 5 shows the empty framework of the storage unit 500 mounted in the back of a golf cart 501. A framework section 502 can be seen protruding downwards into the well 503 of the golf cart 501. This section is a fixed framework protrusion as discussed as item 110 in FIG. 1, rather than the adjustable leg and foot system discussed in FIG. 4. Also visible in FIG. 5 is the extension 504 of the storage unit 500 beyond the rear of the back ledge 505 of the golf cart 501, showing that substantial additional storage volume within the storage unit 500 is gained thereby. Although the golf cart attachment points 506 and 507 are shown touching the storage unit attachment points 508 and 509, in other embodiments depending on the rear framework of the golf card 501 there may be varying distances between the golf cart rear frame and the storage unit, causing varying distances between the attachment points and well 503, which is one reason for the usefulness of adjustable lower protrusions as described in FIG. 4. Alternatively, however, different fixed lower protrusions 502 can be used for different popular models of golf carts, reducing cost and making assembly and installation of the storage unit easier.

Note that while throughout this patent reference is made to "frameworks" of members holding "panels" of various materials, it would also clearly be possible to construct the cuboid faces of this storage unit of rigid materials such that no specific "framework" elements would be needed. Some or all panels could be molded from materials including, but are not limited to, polycarbonate, fiberglass, semiflexible "soft" type plastics such as are used to make garbage cans or food storage containers, and semiflexible "hard" type plastics such as hard shelled luggage material. These semiflexible materials may thereby be molded to form parts of the exterior, all of the exterior, or the entire storage unit. All embodiments described for this invention which refer to frameworks are thereby intended to include alternatives wherein part or all of the storage unit is constructed of such rigid panels without separable framework members, thereby subsuming said framework members within said rigid panels.

Figure 6:
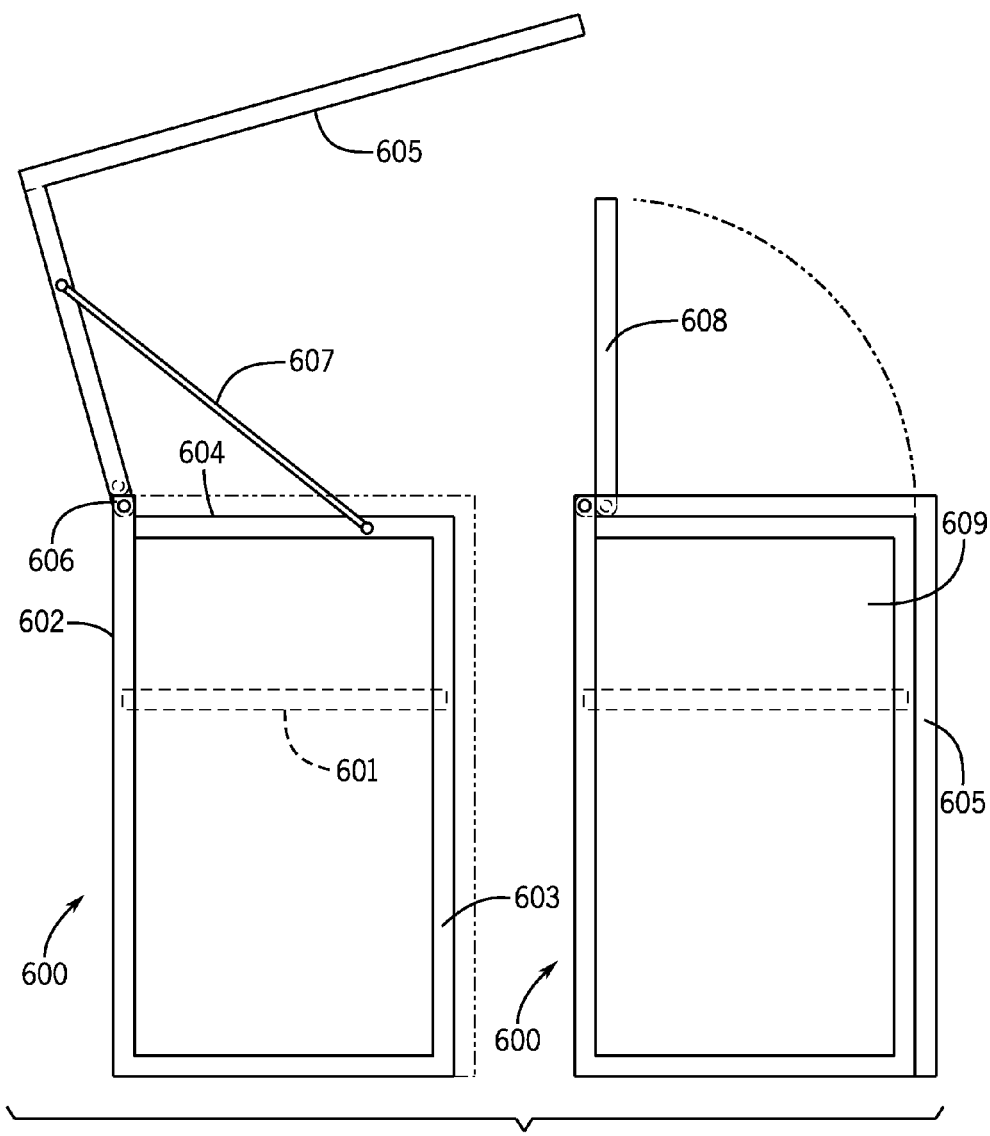
FIG. 6 shows an embodiment of this invention with a L shaped combination front and top door.

Another embodiment of a possible door for this storage unit is shown in FIG. 6. In the figure on the left a side view of the storage unit 600 is shown, with an interior partition 601 and a back face 602, a front face 603 and a top face 604. An "L" shaped door 605 can cover the top face 604 and front face 603, covering both openings at once. This door can be held up by means of systems such as, but not limited to, a locking hinge at 606 or one or more braces 607. In an additional refinement shown in the right hand figure, the top section 608 of this door 605 could separately open while door 605 is closed, forming a door 608 which can permit access to the top compartment 609 of storage unit 600. While this door 608 is shown hingedly pivoting upwards, it could instead pivot on another side or be completely removable. This allows separate fastenings or locks to be used on door 605 and door 608.

In a further embodiment of this invention, visible surfaces of said storage unit could be of different colors or patterns, either to match the golf cart to which it is attached or to stand out from it as a décor element. Removable or interchangeable side panels and/or doors for the visible exterior or interior surfaces of the storage unit could be supplied to allow different combinations of these blending and contrasting functions. In a further embodiment of this invention, visible surfaces of said storage unit could have textures or shapes chosen for their decorative characteristics. In a further embodiment of this invention, patterns comprising private or commercial pictures or text could be displayed, for purposes including but not limited to publicizing brands of people, companies, products or services.

Figure 7:
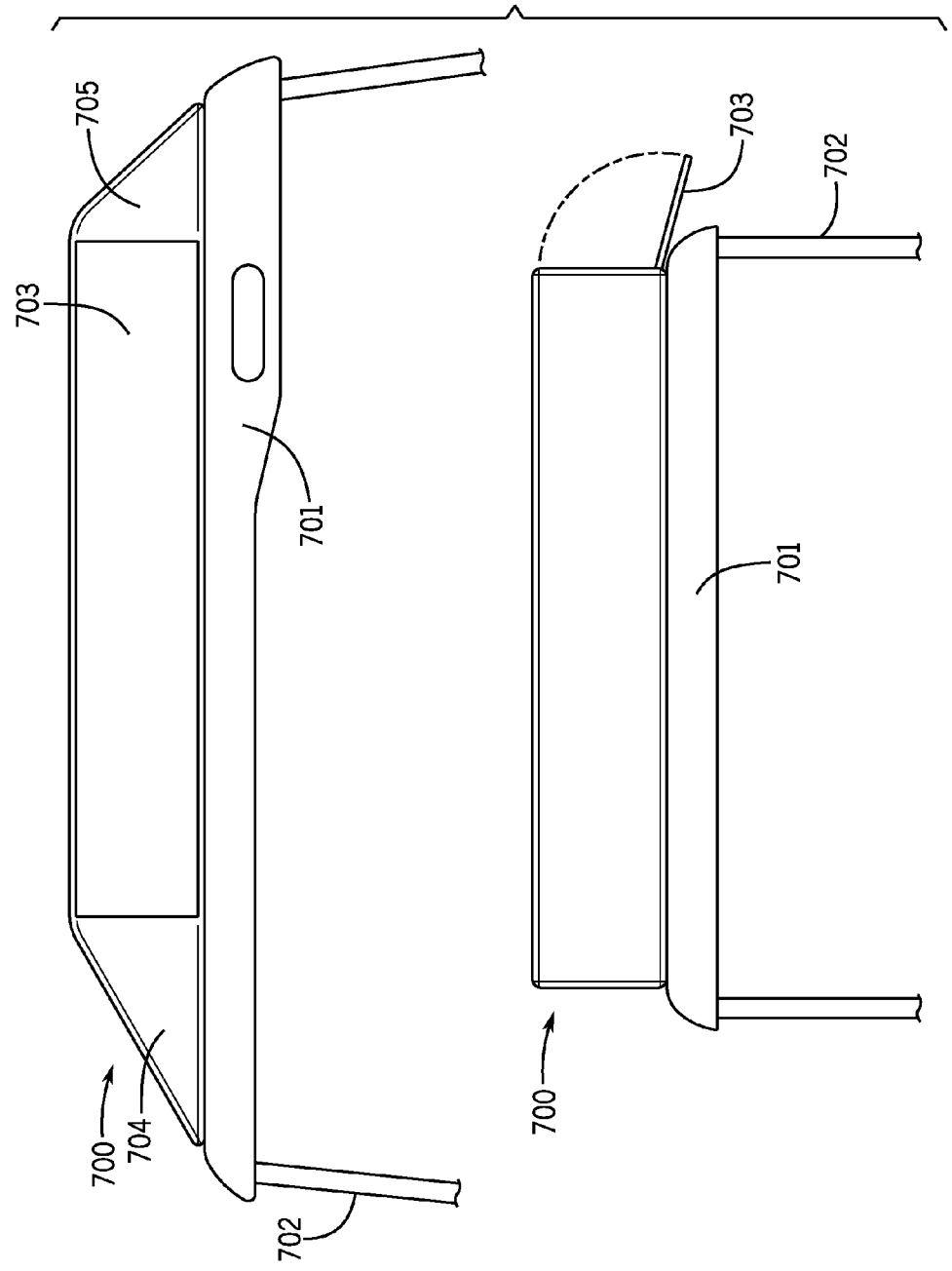
FIG. 7 shows an embodiment of a rooftop storage compartment for a folded storage unit such as described herein.

In a further embodiment of this invention, when the storage unit 300 is folded up such as is described in FIG. 3, it could be placed in a rooftop storage box. FIG. 7 shows such a box 700 mounted on top of the roof 701 of a golf cart on the support framework 702. It would comprise a single compartment sized and shaped to hold the folded storage unit 300, with a door 703 which could be fastened and locked. In a preferred embodiment the door 703 opens to the side of the golf cart. In a preferred embodiment the front 704 and back 705 surfaces of the rooftop storage box are slanted or curved in order to deflect branches if the vehicle is driving under a tree or bush.

It should be understood that the foregoing description is only illustrative of the embodiments. It should also be understood that the embodiments disclosed herein may be used individually or in any suitable combination thereof. Various alternatives and modifications can be devised by those skilled in the art without departing from the embodiments. Accordingly, the present embodiments are intended to embrace all such alternatives, modifications and variances.

What is claimed is:

1. A storage unit mounted on the rear of a golf cart, the golf cart having a rear shelf with a well, comprising:
a removable container occupying substantially the entire rear width of said golf cart, the container being removably attachable to the rear of the golf cart, the container having a bottom panel in a horizontal plane, the container having a protrusion extending downwards from only a portion of the bottom panel horizontal plane of the container into the well, the protrusion not extending downwards substantially further than the depth of the well when the container is attached to the rear of the golf cart, the protrusion being the only substantial part of the storage unit which extends below the bottom panel horizontal plane, the protrusion thereby helping to hold the container on the back of the golf cart, the container being removably attached to the rear frame of the golf cart at an attachment point on the upper section of the container, the container having rigid members forming an approximately cuboid framework, there being panels between the rigid members to form at least one approximately cuboid volume, the volume being accessible by at least one door, and the container having a substantial portion resting on the rear shelf of the golf cart and a substantial portion extending rearwards past the end of the golf cart when the container is fastened to the golf cart.

2. A storage unit as defined in claim 1, wherein the panels are formed of a flexible material.

3. A storage unit as defined in claim 1, wherein the panels are waterproof.

4. A storage unit as defined in claim 1, wherein the container has a removable horizontal internal partition used to subdivide the at least one cuboid volume.

5. A storage unit as defined in claim 1, wherein fastening mechanisms consisting of hooks to which stored items can be attached are present on at least one interior surface of a panel.

6. A storage unit as defined in claim 1, wherein the door swings outward to open and wherein the door further comprises an interior mechanism to releasably latch the door to hold the door closed when the latch is engaged.

7. A storage unit as defined in claim 1, wherein a portion of the at least one cuboid volume is thermally insulated, the thermally insulated portion being removable from the interior of the storage unit, the portion fitting under a top opening door of the storage unit when inserted into the storage unit.

8. A storage unit as defined in claim 1, wherein the cuboid container has hinges at least along each outer corner at the intersections between vertical panels when the cuboid container is mounted on the rear of the golf cart, such that the storage unit can be folded after removal from the rear of the golf cart to take up less space.

9. A storage unit as defined in claim 8, further comprising a compartment attached to the upper side of a roof framework of the golf cart, the compartment having at least one door which is closable and fastenable while the compartment is attached to the roof framework, the compartment having an interior width and length dimension each at least large enough to allow an unfolded panel of the storage unit plus the panel's surrounding framework to fit inside, the folded storage unit fitting through the door when the door is opened, the folded storage unit filling the compartment.

10. A storage unit as defined in claim 1, wherein the container is securable to the rear frame of the golf cart by means of at least one fastening mechanism, the fastening mechanism having a first portion attached to the frame which is accessible from outside the container but which is not removable from the frame from the outside of the container using tools without damaging the first portion, and a second portion extending into the container which only allows detaching the container from the interior of the container, the container having a locked door, the locked door preventing access to the portion of the fastening mechanism which extends into the container.

11. A storage unit as defined in claim 1, wherein the bottom protrusion is adjustable or interchangeable to fit securely in various sized wells of the rear shelf of the golf cart, the interchangeable protrusions each having different shapes to fit in differently shaped or sized wells, whereby the bottom protrusion or combination of bottom protrusions thereby contacts the bottom of the well.

12. A storage unit mounted on the rear of a golf cart, the golf cart having a rear shelf with a well, comprising:
a removable container occupying substantially the entire rear width of said golf cart, the container being removably attachable to the rear of the golf cart, the container having a bottom panel in a horizontal plane, the container having a protrusion extending downwards from only a portion of the bottom panel horizontal plane of the container into the well, the protrusion not extending downwards substantially further than the depth of the well when the container is attached to the rear of the golf cart, the protrusion being the only substantial part of the storage unit which extends below the bottom panel horizontal plane, the protrusion thereby helping to hold the container on the back of the golf cart, the container being removably attached to the rear frame of the golf cart at an attachment point on the upper section of the container, the container comprised of one or more rigid panels enclosing an approximately cuboid volume, the volume being accessible by at least one door, and the container having a substantial portion resting on the rear shelf of the golf cart and a substantial portion extending rearwards past the end of the golf cart when the container is fastened to the golf cart.

13. A storage unit as defined in claim 12, wherein fastening mechanisms consisting of hooks to which stored items can be attached are present on at least one interior surface of a panel.

14. A storage unit as defined in claim 12, wherein the door swings outward to open and wherein the door further comprises an interior mechanism to releasably latch the door to hold the door closed when the latch is engaged.

15. A storage unit as defined in claim 12, wherein the container is securable to the rear frame of the golf cart by means of at least one fastening mechanism, the fastening mechanism having a first portion attached to the frame which is accessible from outside the container but which is not removable from the frame from the outside of the container using tools without damaging the first portion, and a second portion extending into the container which only allows detaching the container from the interior of the container, the container having a locked door, the locked door preventing access to the portion of the fastening mechanism which extends into the container.

16. A storage unit as defined in claim 12, wherein a portion of the at least one cuboid volume is thermally insulated, the thermally insulated portion being removable from the interior of the storage unit, the portion fitting under a top opening door of the storage unit when the portion is inserted into the storage unit.

17. A storage unit as defined in claim 12, wherein the protrusion downwards is interchangeable to fit securely in various sized and shaped wells of the rear shelf of the golf cart, the interchangeable protrusions each having different shapes to fit in differently shaped or sized wells, whereby the bottom protrusion or combination of bottom protrusions thereby contacts at least one of the bottom of the well or two opposing interior walls of the well.

18. A storage unit as defined in claim 12, wherein the cuboid container has hinges at least along each outer corner at the intersections between vertical panels when the cuboid container is mounted on the rear of the golf cart, such that the storage unit can be folded after removal from the rear of the golf cart to take up less space.

19. A storage unit as defined in claim 18, further comprising a compartment attached to the upper side of a roof framework of the golf cart, the compartment having at least one door which is closable and fastenable while the compartment is attached to the roof framework, the compartment having an interior width and length dimension each at least large enough to allow an unfolded panel of the storage unit to fit inside, the folded storage unit fitting through the door when the door is opened, the folded storage unit filling the compartment.

20. A storage unit as defined in claim 12, wherein the protrusion downwards is adjustable to fit securely in various sized and shaped wells of the rear shelf of the golf cart, whereby the bottom protrusion thereby contacts at least two opposing interior walls of the well.

21. A storage unit as defined in claim 20, wherein the protrusion downwards has two sliding components which, in combination, allow the protrusion to be adjusted to match the length and width of the well.

22. A storage unit as defined in claim 20, wherein two adjustable downwards protrusions are used, the attachment locations of which can be adjusted to allow the protrusions to match the length and width of the well.

23. A storage unit as defined in claim 12, wherein the protrusion downwards has a height adjustment component, whereby the height of the protrusion is adjusted to match the depth of the well, contacting the inner bottom surface of the well and thereby providing both support for the storage unit and a lower attachment point into the vehicle well to help hold the storage unit on the rear of the golf cart.

24. A storage unit as defined in claim 12, wherein the protrusion downwards has a sliding component and a rotating component which, in combination, allow the protrusion to be adjusted to match the length and width of the well, thereby providing a lower attachment point into the vehicle well to help hold the storage unit on the rear of the golf cart.

25. A method of using a golf cart to securely transport items, comprising the steps of:
providing a removably attached storage unit as described in claim 12, securing the storage unit to the rear of the golf cart, opening the door to place the items inside the storage unit, and closing and latching the door, the latching method for which may include the additional step of locking the door.

26. A method as defined in claim 25, wherein an additional step of placing hot or cold items in at least one thermally insulated subsection of the storage unit is carried out before the door is closed and latched.

27. A method as defined in claim 25, wherein creating subsections within the storage unit by means of placing or removing movable partitions into the storage unit is carried out before the door is closed and latched.

28. A method as defined in claim 25, wherein an additional step is performed of securing items by means selected from the set of attaching the items to attachment points and holding items in place by use of straps, the additional step being carried out before the door is closed and latched.

29. A method as defined in claim 25, wherein an additional step of unfolding the storage unit from a more compact state is performed before attaching the storage unit to the rear of the golf cart.

30. A storage unit mounted on the rear of a golf cart, the golf cart having a rear shelf with a well, comprising:
a removable container occupying substantially the entire rear width of said golf cart, the container being removably attachable to the rear of the golf cart, the container having a bottom panel in a horizontal plane, the container only having a protrusion or protrusions extending downwards from the portion of the bottom panel horizontal plane of the container over the well, the protrusion or protrusions extending downwards into and contacting the bottom surface of the well, the protrusion or protrusions thereby helping to hold the container on the back of the golf cart, the container being removably attached to the rear frame of the golf cart at an attachment point on the upper section of the container, the container comprised of one or more rigid panels enclosing an approximately cuboid volume, the volume being accessible by at least one door, and the container having a substantial portion resting on the rear shelf of the golf cart and a substantial portion extending rearwards past the end of the golf cart when the container is fastened to the golf cart.

31. A storage unit as defined in claim 30, wherein the protrusion or protrusions downwards are interchangeable to fit securely in various sized and shaped wells of the rear shelf of the golf cart, the interchangeable protrusions each having different heights to fit in differently shaped or sized wells.

32. A storage unit as defined in claim 30, wherein the protrusion or protrusions downwards are adjustable to fit securely in various sized and shaped wells of the rear shelf of the golf cart, the adjustable protrusions having at least one of sliding or rotating components for height adjustment to fit in differently shaped or sized wells.

33. A storage unit as defined in claim 30, wherein a portion of the at least one cuboid volume is thermally insulated, the thermally insulated portion being removable from the interior of the storage unit, the portion fitting under a top opening door of the storage unit when inserted into the storage unit.

34. A storage unit as defined in claim 30, wherein the cuboid container has hinges at least along each outer corner at the intersections between vertical panels when the cuboid container is mounted on the rear of the golf cart, such that the storage unit can be folded after removal from the rear of the golf cart to take up less space.

35. A storage unit as defined in claim 30, wherein the container is securable to the rear frame of the golf cart by means of at least one fastening mechanism, the fastening mechanism having a first portion attached to the frame which is accessible from outside the container but which is not removable from the frame from the outside of the container using tools without damaging the first portion, and a second portion extending into the container which only allows detaching the container from the interior of the container, the container having a locked door, the locked door preventing access to the portion of the fastening mechanism which extends into the container.

36. A storage unit mounted on the rear of a golf cart, the golf cart having a rear shelf with a well, comprising:
a removable container occupying substantially the entire rear width of said golf cart, the container being removably attachable to the rear of the golf cart, the container having a bottom panel in a horizontal plane, the container only having a protrusion or protrusions extending downwards from the portion of the bottom panel horizontal plane of the container over the well, the protrusion or protrusions extending downwards into and contacting at least two opposing interior walls of the well, the protrusion or protrusions thereby helping to hold the container on the back of the golf cart, the container being removably attached to the rear frame of the golf cart at an attachment point on the upper section of the container, the container comprised of one or more rigid panels enclosing an approximately cuboid volume, the volume being accessible by at least one door, and the container having a substantial portion resting on the rear shelf of the golf cart and a substantial portion extending rearwards past the end of the golf cart when the container is fastened to the golf cart.

37. A storage unit as defined in claim 36, wherein the protrusion or protrusions downwards are interchangeable to fit securely in various sized and shaped wells of the rear shelf of the golf cart, the interchangeable protrusions each having different widths or lengths of the part fitting in the well to make wall contacts in differently shaped or sized wells.

38. A storage unit as defined in claim 36, wherein the protrusion or protrusions downwards are adjustable to fit securely in various sized and shaped wells of the rear shelf of the golf cart, the adjustable protrusions having at least one of sliding or rotating components for at least one of width or length adjustment to make wall contacts in differently shaped or sized wells.

39. A storage unit as defined in claim 36, wherein a portion of the at least one cuboid volume is thermally insulated, the thermally insulated portion being removable from the interior of the storage unit, the portion fitting under a top opening door of the storage unit when inserted into the storage unit.

40. A storage unit as defined in claim 36, wherein the cuboid container has hinges at least along each outer corner at the intersections between vertical panels when the cuboid container is mounted on the rear of the golf cart, such that the storage unit can be folded after removal from the rear of the golf cart to take up less space.

41. A storage unit as defined in claim 36, wherein the container is securable to the rear frame of the golf cart by means of at least one fastening mechanism, the fastening mechanism having a first portion attached to the frame which is accessible from outside the container but which is not removable from the frame from the outside of the container using tools without damaging the first portion, and a second portion extending into the container which only allows detaching the container from the interior of the container, the container having a locked door, the locked door preventing access to the portion of the fastening mechanism which extends into the container.

42. A method of using a golf cart to securely transport items comprising the steps of:
providing a removably attachable storage unit as described in claim 36, and contacting the two opposing interior walls of the well by either attaching the protrusion or protrusions in suitable locations to make the contacts, or by adjusting the protrusion or protrusions to make the contacts.

43. A method as defined in claim 42, further comprising attaching the storage unit at the attachment point on the upper section of the storage unit by providing a fastening mechanism having a first portion attached to the frame of the golf cart which is accessible from outside the container but which is not removable from the frame from the outside of the container using tools without damaging the first portion, inserting a second portion of the fastening mechanism into the storage unit, opening a door of the storage unit, attaching the second portion of the fastening mechanism to the storage unit, thereby holding the storage unit on the rear of the golf cart, closing the door, and locking the door.

* * * * *